US008677896B2

(12) United States Patent
Vanhoutte et al.

(10) Patent No.: US 8,677,896 B2
(45) Date of Patent: Mar. 25, 2014

(54) SQUARE BALER WITH A STAR WHEEL SENSOR

(71) Applicant: CNH America LLC, New Holland, PA (US)

(72) Inventors: Peter Vanhoutte, Varsenare (BE); Stefan De Rycke, Zulte (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/672,390

(22) Filed: Nov. 8, 2012

(65) Prior Publication Data

US 2013/0112092 A1   May 9, 2013

(30) Foreign Application Priority Data

Nov. 9, 2011   (BE) .................................. 2011/0654

(51) Int. Cl.
*A01F 15/14*   (2006.01)
(52) U.S. Cl.
USPC .......................... 100/4; 100/19 R; 100/188 R

(58) Field of Classification Search
USPC ...... 100/4, 7, 19 R, 187, 188 R; 56/341, 342, 56/343
See application file for complete search history.

(56) References Cited

U.S. PATENT DOCUMENTS

| 2,987,335 | A | * | 6/1961 | Tarbox .............................. 289/2 |
| 3,895,571 | A | * | 7/1975 | Freeman ........................... 100/4 |
| 3,931,760 | A | * | 1/1976 | Cheatum .......................... 100/4 |
| 5,058,495 | A | * | 10/1991 | Van Den Bossche et al. .... 100/4 |
| 6,248,963 | B1 | * | 6/2001 | Gottlober ..................... 177/136 |
| 6,302,015 | B1 | * | 10/2001 | Kendrick et al. ................. 100/4 |
| 6,377,058 | B1 | | 4/2002 | Pemrick |
| 7,318,376 | B1 | | 1/2008 | Baldauf et al. |

* cited by examiner

*Primary Examiner* — Jimmy T Nguyen
(74) *Attorney, Agent, or Firm* — Patrick M. Sheldrake

(57) ABSTRACT

A square baler has a baling chamber with slots in the top of the baling chamber for receiving twines to tie bales, and a star wheel sensor having a housing mounted on the exterior of the baling chamber and a star wheel in the housing and passing through one of the slots to contact the crop material of the bale being formed in the baling chamber. A deflector is mounted on the baling chamber to extend through the same slot as the star wheel sensor. The deflector has a region inclined relative to the slot to deflect the twine away from the star wheel.

8 Claims, 1 Drawing Sheet

SQUARE BALER WITH A STAR WHEEL SENSOR

CROSS REFERENCE TO RELATED APPLICATION

This Patent Application claims priority under 35 U.S.C. §119 to BE 2011/0654, filed on Nov. 9, 2011 titled, "Square Baler with a Star Wheel Sensor" and having Peter Vanhoutte and Stefan De Rycke as inventors. The full disclosure of BE 2011/0654 is hereby fully incorporated herein by reference.

FIELD OF THE INVENTION

The present invention relates to a square baler having a star wheel sensor.

BACKGROUND OF THE INVENTION

Star wheel sensors are used in square balers to measure the length of the bale being formed to determine when to initiate a knotting cycle. They are also used in pairs as electrodes to measure the moisture content of the crop material, as described in U.S. Pat. No. 6,377,058.

The top of a baling chamber in a square baler is formed by longitudinally extending beams that are separated by slots. The slots receive lengths of twine that pass around the bale, the ends of the twines being knotted together by a knotter once a bale has reached the desired size in order to tie the finished bale.

When mounting a star wheel sensor on top of the baling chamber, the star wheel is commonly positioned so that its teeth pass through one of these slots to make contact with the crop material of the bale in the process of being formed. However, a problem is then encountered is that on occasions twine can become entangled with the teeth of star wheel and be wrapped around its axle. This can damage the sensor and interfere with the discharge of the bale.

SUMMARY OF THE INVENTION

With a view to mitigating the foregoing problem, the present invention provides a square baler having a baling chamber, slots in the top of the baling chamber receiving twines that serve to tie the bales, and a star wheel sensor having a housing mounted on the exterior of the baling chamber and a star wheel rotatably supported by an axle in the housing and passing through one of the slots to contact the crop material of the bale being formed in the baling chamber, characterised in that a deflector is mounted on the baling chamber to extend through the same slot as the star wheel sensor into the path of the twine, the deflector having a region inclined relative to the slot to as to deflect the twine away from the star wheel and thereby prevent the twine from becoming entangled in the sensor.

Conveniently, the deflector is a formed of a plate having two mutually inclined regions, the first region being secured to the housing of the sensor and the second region serving to deflect twine in the slot away from the star wheel.

BRIEF DESCRIPTION OF THE DRAWINGS

The invention will now be described further by way of example, with reference to the accompanying drawings, in which.

DETAILED DESCRIPTION OF THE PREFERRED EMBODIMENT

Figure 1:
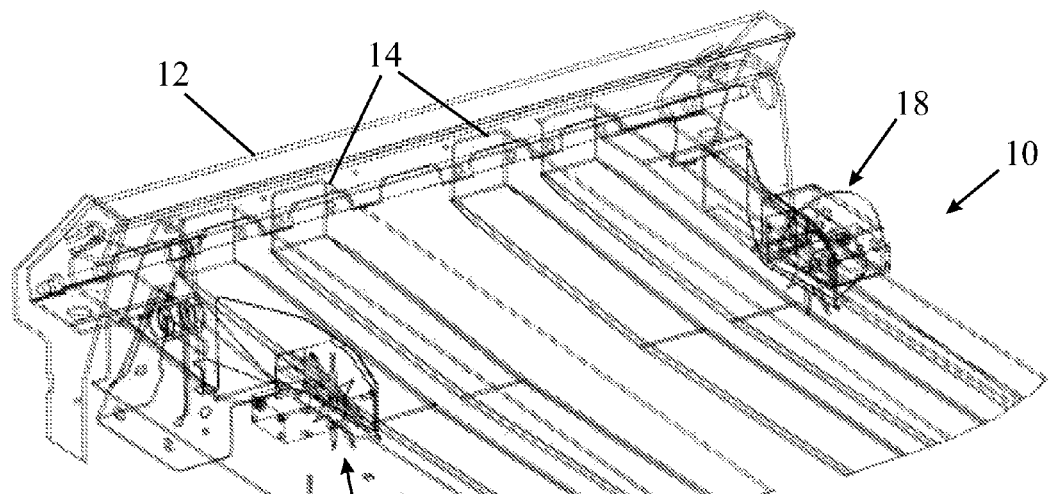
FIG. 1 is a perspective view from above of the top of a baling chamber of a square baler embodying the invention.
Figure 2:
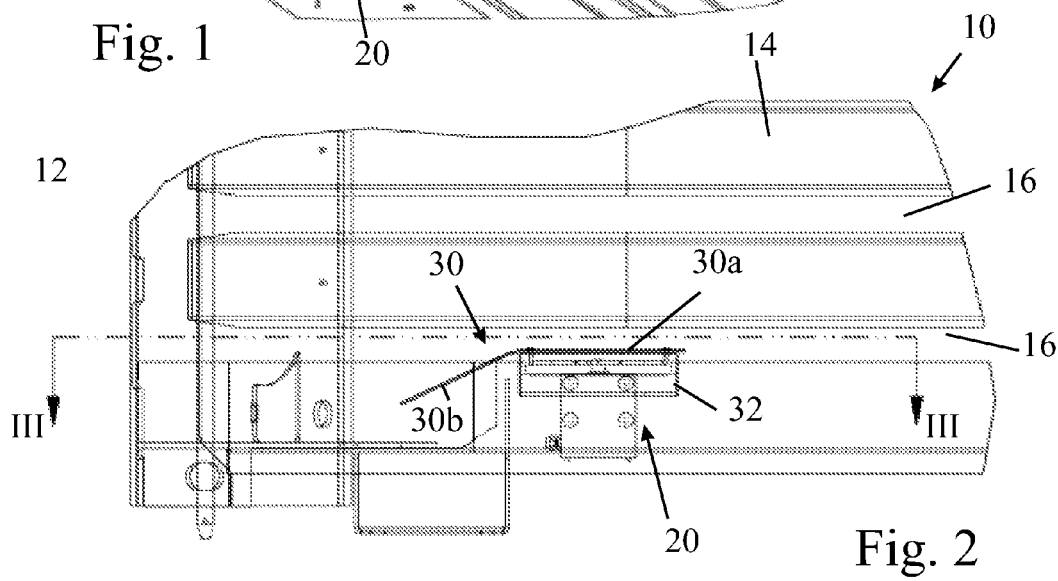
FIG. 2 is a partial plan view from above of the baling chamber of FIG. 1.
Figure 3:
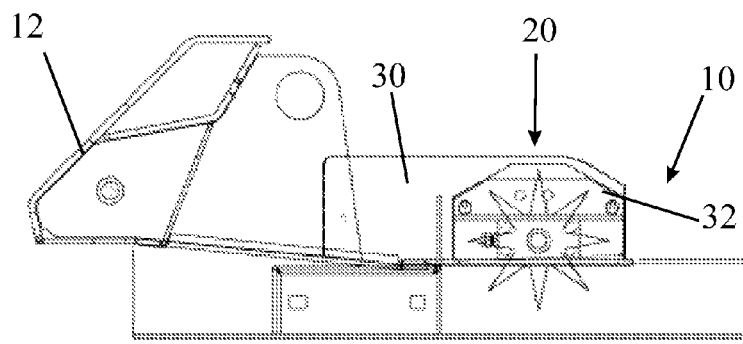
FIG. 3 is a section in the plane III-III in FIG. 2.

FIG. 1 shows the top of the front end of the baling chamber 10 of a square baler, this being the end of the baling chamber 10 facing forward in the direction of travel of the baler. A reinforcement cross beam 12 extends transversely across the baling chamber 10. Knotters that are not shown in the drawings are arranged adjacent and forward of the cross beam 12.

The top of the baling chamber 10 is formed of spaced parallel longitudinally beams 14 of rectangular cross-section defining slots 16 between them. At the commencement of a baling cycle, spaced lengths of twine connected to respective supply reels are disposed vertically in the baling chamber. As crop is fed from beneath into the baling chamber and compressed into slices by the reciprocation of a plunger, the bale grows in size and its end moves towards the rear of the baling chamber. As it does so, twine is drawn from the supply reels to create runs of twine above and the below the partially formed bale and these lengths of twine are received within the slots 16 between the beams 14.

A sensor 18 has a star wheel located in one of the slots 16 to make contact with the crop material in the baling chamber. The star wheel rotates as the bale grows thereby providing an indication of the current length of the bale in the process of being formed. When the bale achieves a desired size, needles raise the lower runs of twine to the level of the knotters, which then tie off the completed bale and make a further knot in each pair of twines to produce the vertical lengths required for the commencement of the next bale.

The illustrated embodiment has a second star wheel sensor 20 that is connected in circuit with the first sensor 18 to provide an indication of the moisture content of the crop as described in U.S. Pat. No. 6,377,058.

As so far described, the square baler 10 is entirely conventional and its construction and operation will be understood by the person skilled in the art without the need for more detailed explanation.

The problem addressed by the present invention is that the star wheels of the sensor 18 and 20 pass through slots 16 that also receive runs of twine partially surrounding the bale being formed. If the twines become entangled in the teeth of a star wheel, they are picked up and wrapped around the axle of the star wheel causing damage to the sensor and also snagging the twines thereby interfering with the discharge of the bale.

To avoid this problem, a deflector 30 is secured to the housing 32 of each sensor 18, 20. The deflector 30 is formed of two regions that are inclined relative to one another, the region extending parallel to the slots 16 and being secured to the housing 32 and the region 30b being inclined relative to the lot 16. The deflector 30 passes through the slot 16 into the path of the twine forward of the star wheel of the sensor. The action of the inclined region 30b of the deflector 30 is to push the twine as the bale moves towards the discharge end of the baling chamber so that it passes on the inside of the start wheel so that it cannot become entangled with it.

We claim:

1. A square baler having a baling chamber comprising
a slot in the top of the baling chamber for receiving a path of twine that serve to tie the bales,
a star wheel sensor having a housing mounted on the exterior of the baling chamber and a star wheel rotatably supported by an axle in the housing and passing through the slot to contact the crop material of the bale being formed in the baling chamber; and a deflector mounted on the baling chamber extending through the same slot as the star wheel sensor (18,20) into the path of the twine, the deflector having a region inclined relative to the slot configured to deflect the twine away from the star wheel.

2. A square baler as claimed in claim 1, wherein the deflector includes a plate having two mutually inclined regions, the first region being secured to the housing of the sensor and the second region serving to deflect the twine away from the star wheel.

3. A square baler as claimed in claim 2, further comprising a second star wheel having a corresponding second star wheel sensor and slot located on an opposing side of the baler from the other sensor wheel and each sensor wheel having a respective plate.

4. A square baler as claimed in claim 3, wherein the plates of each star wheel sensor are mirrored with relation to each other.

5. A square baler as claimed in claim 1, wherein the deflector comprises a plate and a bottom side of the plate does not extend below a bottom of a beam forming a portion of the top of the baling chamber.

6. A square baler as claimed in claim 2, wherein the plate is mounted at an angle.

7. A square baler as claimed in claim 1, wherein the deflector passes through the slot into the path of the twine forward of the star wheel of the sensor.

8. A square baler as claimed in claim 7, wherein the inclined region of the deflector is angled to deflect twine to the inside of the star wheel as the bale moves toward a discharge end of the chamber.

* * * * *